United States Patent

[11] 3,624,420

| [72] | Inventors | Ronald L. Krutz<br>Irwin;<br>Alexander P. Lezark, Monroeville; Alvin B. Marcus, Pittsburgh, all of Pa. |
|---|---|---|
| [21] | Appl. No. | 2,337 |
| [22] | Filed | Jan. 12, 1970 |
| [45] | Patented | Nov. 30, 1971 |
| [73] | Assignee | Gulf Research & Development Company<br>Pittsburgh, Pa. |

[54] CONTROL SYSTEM FOR A PLURALITY OF MASS SPECTROMETERS
9 Claims, 4 Drawing Figs.

[52] U.S. Cl............................................. 307/38, 250/41.9
[51] Int. Cl............................................. H02j 3/14
[50] Field of Search................................. 307/31, 35, 32, 38, 11, 39, 40, 41; 250/41.9

[56] References Cited
UNITED STATES PATENTS
3,521,077  7/1970  Buenzli, Jr..................... 307/31

Primary Examiner—Herman J. Hohauser
Attorneys—Meyer Neishloss, Deane E. Keith and William Kovensky

ABSTRACT: A computerized control system for a plurality of mass spectrometers, wherein voltage ranges corresponding to predetermined ions are selected and programmed into the computer. Instead of the usual scan, the computer drives a power supply to move from range to range, and to vary the voltage incrementally within each range to accurately define the peaks of interest. The voltage delivered at the spectrometer is fed back to the computer to serve as a check on the power supply and the overall system.

INVENTORS.
RONALD L. KRUTZ
ALEXANDER P. LEZARK
ALVIN B. MARCUS

CONTROL SYSTEM FOR A PLURALITY OF MASS SPECTROMETERS

This invention relates to the field of computer control of analytical equipment, and more particularly it pertains to such a system for controlling a plurality of mass spectrometers.

As is known, mass spectroscopy is a means for both qualitatively and quantitatively analyzing chemical compounds. A mass spectrometer most usually is used in conjunction with other analytical instruments, such as a chromatograph, which other instruments serve to perform a preliminary analysis on an unknown. Thus, when used in such a tandem arrangement, the first analysis, such as is performed by a chromatograph, can be thought of as the coarse analysis, and the second analysis, performed by the mass spectrometer, can be thought of as the fine analysis of the unknown sample.

The mass spectrometer operates, typically, by ionizing the unknown sample and then directing the ions, by means of a suitable applied electric potential, into an analyzer region consisting of electric and/or magnetic fields. At one end of the analyzer, opposite from the point of entry of the ions, is a suitable ion collector assembly masked by a slit. Essentially, the trajectory of the ions in the analyzer depends upon the mass of each ion. In general, one may choose the electric and/or magnetic field intensity such that only that trajectory followed by ions of a particular mass falls within the collector slit. By sweeping the electric or magnetic field, ions are sequentially brought into registry with the slit depending upon the sequence of their mass numbers. The fields in the analyzer are controlled either by supplying voltages directly to the analyzer, or by supplying control voltages which are then conditioned within the spectrometer. The mass scan may be expressed mathematically as:

$$M = Kf(V) \qquad (1)$$

where $M$ is mass, $V$ is a suitable applied voltage, and $K$ is an apparatus constant. The functional relationship $f(V)$ depends upon the particular type of mass spectrometer.

For mass spectrometers which scan by sweeping the accelerating voltage, the mathematical form is often $$M = K/V \qquad (2)$$

where $V$ is the accelerating voltage.

These equations will be referred to again in the detailed description below.

Different types of mass spectrometers operate slightly differently to determine the weight or mass number of an unknown ion, and the invention is applicable for use with all of them.

Thus, there is in mass spectroscopy generally some point at which a voltage is varied or scanned, and the occurrence of some event during the scan which is correlable to the mass number of the unknown. It will, of course, be understood that the above is a simplified explanation of the technique of mass spectroscopy. Modern instruments are highly sophisticated and include various accelerating plates, focusing plates, magnetic fields, various configurations of ion transmission tubes, and the like, all of which are easily accommodated by those skilled in the art and have little effect on cooperation between the improvements of the invention and such instruments. In those instruments which utilize magnetic rather than electrical scanning, the relationship between the magnetic field produced and the electrical current supplied is not as simple, which will make it somewhat more difficult to apply the invention to such instruments.

The problems present in such prior methods and apparatuses which are solved by the present invention include that the technique of continuously scanning is highly time consuming, it requires the continuous attention of a skilled operator, and, of course, only one instrument can be manipulated by the operator at any one time.

The essential manner of operation of the present invention includes utilization of the fact that in any analysis the operator knows what elements or mass numbers, at least qualitatively, are in the unknown, or else is interested in only certain mass numbers therein. The invention provides computer control of a plurality of mass spectrometers wherein the computer, under program control, serves the function of the prior continuous scan by intermittently varying the voltage from one general area to the next, at which voltages or areas of voltage it is known that peaks corresponding to the elements of interest in the unknown must fall. The second step in the method of the invention is to thereafter, once the general areas at which the peaks of interest will occur have been determined, change or step the voltage within the said predetermined areas or ranges in extremely small increments to very accurately define the peak height, to thereby very accurately determine the composition of the unknown. The programming of the computer controls certain other functions within this second step, such as determining in which direction to make the narrow incremental changes in voltage based on the trend of change of the intensity of the ion beam. That is, if the first change or few changes in incremental steps indicate that intensity is decreasing, the program will cause the power supply to commence making changes or steps in the opposite direction so as to move up the curve towards the peak.

The invention provides a precision voltage supply, capable of producing incremental changes in the voltage supplied to the scanning means within the mass spectrometer in steps as small as 10 millivolts over the entire mass scan. The invention achieves substantially greater accuracy at substantially less cost than prior known systems. Additionally, the cost of apparatus embodying the invention, with the capacity to control three spectrometers, is about half the cost of comparable prior known systems.

The invention obtains these advantages with the use of a commercial precision voltage supply in combination with a small commercial programable digital computer to drive the voltage supply under program control, with the output of the voltage supply being selectively supplied to the voltage input of the mass spectrometers. Because of the speed of the computer, the system can be utilized to drive a plurality of mass spectrometers, suitable switching circuits and separate instrument operator consoles being provided. As a further control on the accuracy of the voltage supply, feedback means between the particular mass spectrometer then being controlled and the computer are provided whereby, in effect, the accuracy of the voltage supply itself is checked against the voltage actually produced at the scan of the mass spectrometer to compensate for inaccuracies or losses that may occur within the mass spectrometer, within the switching circuits, or elsewhere.

This feedback feature can be advantageously utilized in those instruments having a magnetic rather than an electrical scan. A gaussometer probe would be installed in the magnet, and the power supply arranged so as to feed current to the coils of the magnet. The probe output voltage, which is proportional to the magnetic field actually produced, would be the feedback voltage, thereby permitting the computer to adjust the current fed to the magnet's coils, as needed, to produce the desired magnetic field.

In prior known computer-controlled mass spectrometer systems, elaborate and expensive programs or software are required for sampling, that is, to "detect" the peaks as they appear during a continuous scan. The present invention renders all such programs unnecessary since the spectrometer steps directly to the peaks or peak areas. Further, the complex curve fitting program routines required by such prior systems are not needed by the present invention.

In addition, the hardware costs and complexity can be reduced (especially that of the analog-to-digital converter) since high sampling rates are not needed to acquire the accelerating voltage and ion intensity data as in conventional methods. In conventional methods, these parameters have to be obtained "on the fly," i.e., while they are changing during a run. An integrating digital voltmeter can be used which gives the system of the invention a greater immunity from noise than the high-speed sampling digital voltmeters which must be used with other computerized systems.

The above and other advantages of the invention will be pointed out or will become evident in the following detailed description and claims, and in the accompanying drawing also forming a part of the disclosure, in which:

Figure 1:
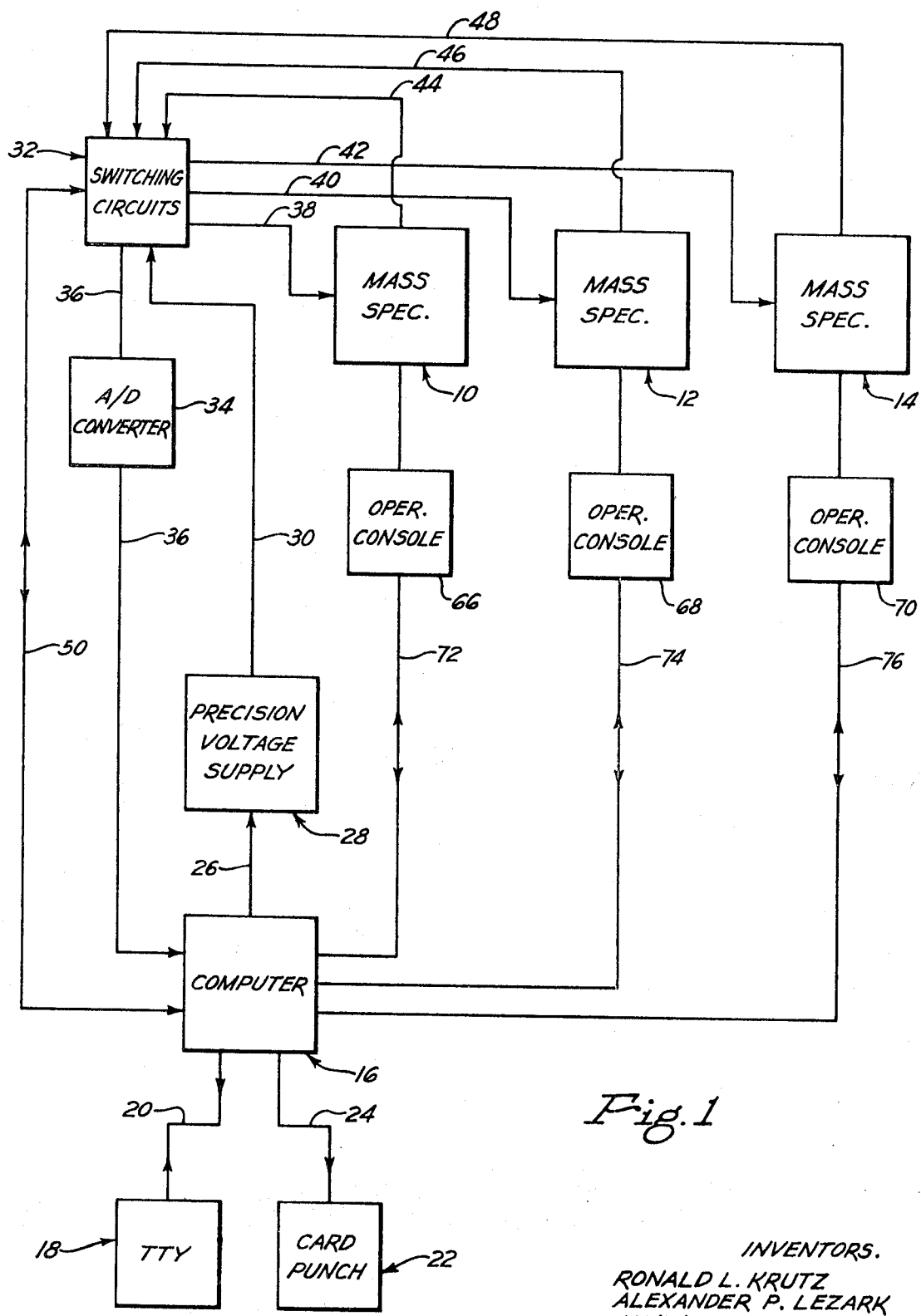
FIG. 1 is a schematic diagram of apparatus embodying the invention shown controlling three mass spectrometers.

Referring now in detail to the drawing, there are shown three mass spectrometers 10, 12 and 14. The invention can be used to control more or fewer than three spectrometers, and the number shown was chosen for example purposes only. Additionally, as is obvious to one skilled in the art, the control system of the invention can be used in other environments in addition to mass spectrometers or instrumentation.

The control system includes a computer 16, which may be a relatively small, general purpose, stored program, commercial digital computer having a memory capacity of 8,192 words of 16 bits each. Such a computer can be obtained from Varian Data Machines of Irvine, Calif., their Model No. 620/i.

The operating personnel can communicate with the computer in any of the usual manners, and by way of example there is shown a teletypewriter 18, marked TTY on FIG. 1 of the drawing, which is connected to computer 16 by a line 20. Output means in the form of a card punch device 22 is also connected to the computer 16 by a line 24. Teletypewriter 18, in conjunction with suitable programming in computer 16, permits a conversational mode of instruction-giving to and asking of questions by the computer in controlling the mass spectrometers 10, 12 and 14. The double arrows on line 20, as well as the double or single arrows on the various other lines described below, indicate either one-way or two-way communication between the components interconnected by that particular line. Thus, the single arrowhead on line 24 indicates that card punch 22 is used solely as an output device. Further, as will be obvious to those skilled in the art, each of the "lines" 20, 24 and the others described below, may represent a bundle of separate electrical conductors rather than a single "line" in the most elementary sense.

Computer-generated signals to control the scanning means of the three or plurality of mass spectrometers are supplied on a line 26 to a precision voltage supply 28. In the embodiment of the invention currently being constructed, voltage supply 28 is a two-stage apparatus, the two stages being connected in series, with a first stage at the lower end of the voltage range from 0 to 1,000 volts and with a second stage for the higher end of the voltage range from 1,000 up to 3,300 volts. Such apparatus is commercially available from The John Fluke Manufacturing Company, Inc., Wash., Seattle, Washington, their Model Nos. 4150A and 3,330A. The precision voltages generated within supply 28 are supplied on a line 30 to switching circuits 32, described below, which interconnect the mass spectrometers 10, 12 and 14 with the computer 16 and voltage supply 28, and with another component described below.

As will be apparent to those skilled in the art, power supply 28 could as well be used to supply precision amperages rather than precision voltages. Similarly, the entire invention is not limited to use with mass spectrometers, but could be used in conjunction with other instruments such as photoelectric emission spectrometers. The essential set of circumstances for use of the invention is that the point of use, the mass spectrometers or other instruments or the like, require electrical or other controllable power that is varied over a range, and that this power vary between regions in large steps and within each region in small steps. More in particular, the amplitude of another signal, ion current in a mass spectrometer, is to be measured, and this other signal varies in response to the supplied power and also goes through a point of interest, such as a maximum peak, as the supplied power is varied in small steps. The maximum amplitude of this other signal in mass spectroscopy, at various known values of the supplied power, is sought.

Means are provided to feed date back to the computer from the mass spectrometers as to the actual voltages on the deflection plates or like means of the instruments. To this end, an analog-to-digital (A/D) converter 34 is provided in a line 36 running between switching circuits 32 and the computer 16. This A/D converter acts as an automatic check and constant update on the output voltages supplied from power supply 28 via line 30 and the switching circuits to the mass spectrometers.

It is the combination of these three relatively inexpensive commercial components, namely, the A/D converter 34, the power supply 28, and the computer 16, which yields the very substantial economic savings of the present invention over the best prior art devices heretofore available. Apparatus embodying the invention is in the process of being built and will cost approximately half the cost of the best equipment heretofore available, and additionally will provide more accurate results than said prior equipment, and further additionally will control three mass spectrometers rather than just one. A suitable device for use of A/D converter 34 is available from Varian, mentioned above, their Model No. ADC-100.

Switching circuits 32 include suitable means to feed the voltage signals on line 30 from the power supply to one of three lines 38, 40 and 42, which lead to the scanning control input connection on each of the three mass spectrometers 10, 12 and 14. As will be understood by those skilled in the art, the spectrometers themselves could be modified to permit the signals on lines 38, 40 and 42 to feed directly to the deflection apparatus or acceleration electrodes within the spectrometer and bypass the spectrometer's internal voltage control, thereby precluding overall accuracy of the invention from being dependent upon the accuracy of the spectrometer's internal electronics. Similarly, switching circuits 32 provide means to interconnect any one of three lines 44, 46 or 48 to line 36 to feed back data from the spectrometers through A/D converter 34 to computer 16 as to the actual voltage on the deflection systems or plates of the instruments, and as to the value of the ion intensity occurring at the program-controlled accelerating voltages.

The computer can only control one instrument at a time as to supplying voltages to the deflection plates or other such means of the instrument. However, the three instruments could be operated under the computer's control virtually simultaneously, or effectually so for all practical purposes, at some additional cost for higher speed hardware and some additional software. While a first instrument is going through the steps necessary to calibrate or prepare the sample, or other preliminary matters, the second instrument could be actually performing a scan, and the third instrument could be feeding back data to be put out on card punch 22, TTY 18, and/or other output means. To this end, a line 50 interconnecting the switching circuits 32 and the computer 16 is provided. It is via this "two-way line" 50 that the computer "moves" from one instrument to the other by selecting the proper path through the switching circuits.

Figure 2:
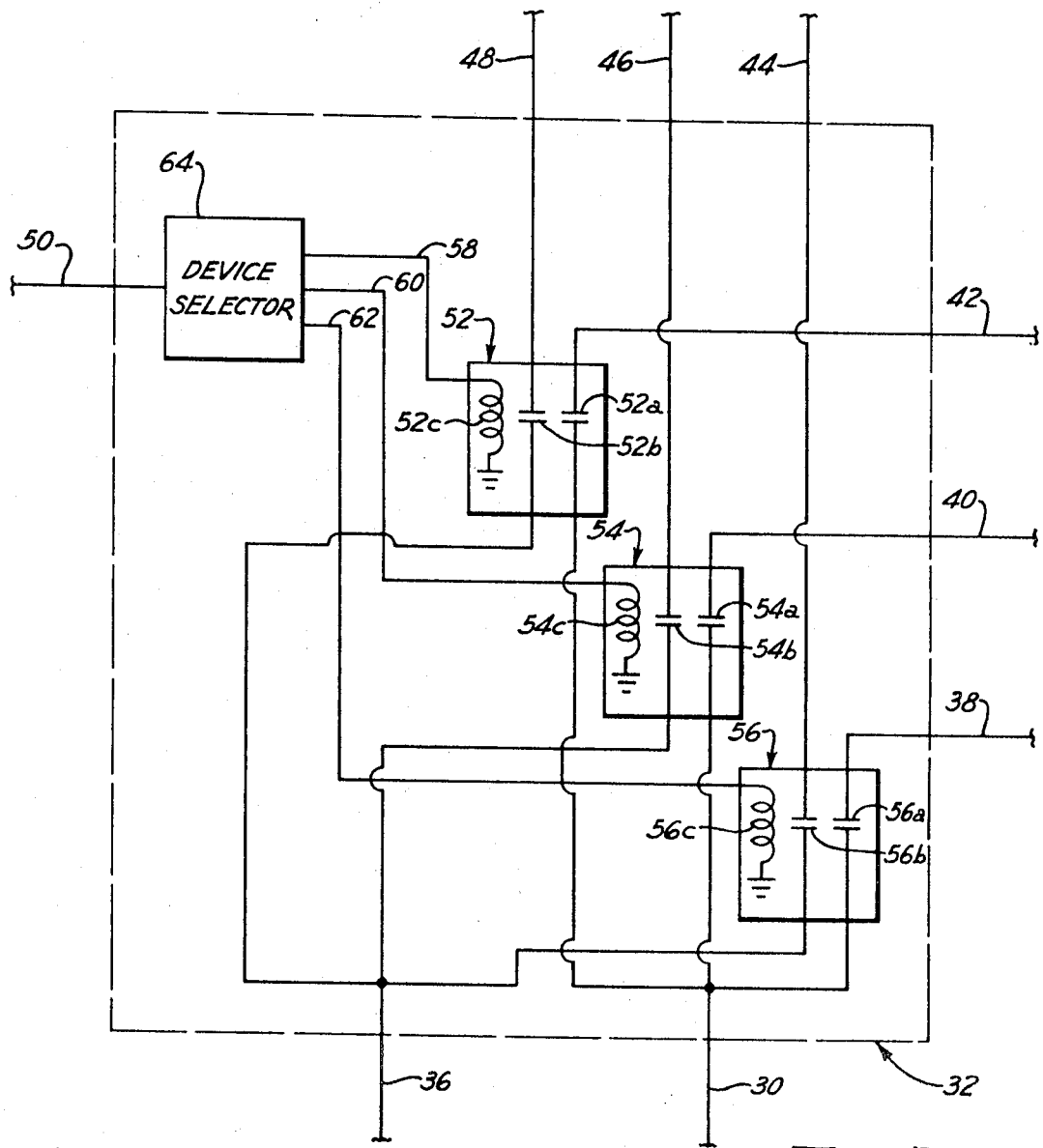
FIG. 2 is a schematic diagram of the switching circuits shown in FIG. 1.

Referring now to FIG. 2, the switching circuits 32 are shown in detail, and comprise three relays 52, 54 and 56. The showing of electromechanical relays is by way of example only, it being clear to those skilled in the art that field effect transistors, or bipolar transistor switches, or the like, could as well be used. Relay 52 comprises a pair of normally open contacts 52a and 52b, and a coil 52c. Similarly, the other two relays each comprise a pair of normally open contacts and a coil indicated by the reference numeral of the relay followed by a, b and c respectively. One end of the coil of each relay is connected to ground, and the other end of each coil is connected to a line 58, 60 and 62 extending from a device selector 64. Device 64 receives signals via line 50 directly from computer 16. A coded signal on line 50 to device 64 will activate one of the three relays, as determined by the computer. Selector 64 is a standard item of commerce, one source being the Fairchild Company of Mountain View, California, their Model No. 9301.

The $a$ contacts of the three relays interconnect line 30 from the power supply 28 with a respective one of the lines 38, 40 or 42 to supply voltage to a respective one of the three instruments 10, 12 or 14. Similarly, feedback data from the instruments on the lines 44, 46 and 48 pass through the $b$ contacts of the relays to line 36 feeding back to A/D converter 34. Thus, as is now obvious, the computer determines which instrument is to be serviced and sends an appropriate coded signal on line 50 to device 64. For example purposes, let it be assumed that spectrometer 12 is to be serviced. Device 64 will supply power on line 60 to the coil 54c of relay 54, thus closing the normally open contacts 54a and 54b of that relay. Closing of the contacts establishes two circuits, from line 40 to line 30 to supply power to the instrument 12, and from line 46 to line 36 to feed back the voltage supplied data from the instrument to the computer.

Operating in conjunction with line 50, and tied into the normal on-off, status indication, and other usual controls of and/or controls cooperative with each instrument, are three operator's consoles 66, 68 and 70, each interposed in a "two-way line" 72, 74 and 76, respectively, which interconnect said consoles with computer 16. Each of the operator's consoles is essentially simply a duplicate of the controls on the instrument, with the addition of a "READY" light, or other suitable device, which indicates to the operator that the computer is available to him at that time. Each console also includes an "IN-USE" light or the like to indicate that the computer is then servicing another instrument and the operator should wait a few moments until he sees the "READY" light. Since all the "lines" used are one or more electrical conductors, it is a simple matter to accommodate a plurality of instruments located remotely from each other. As will be apparent to those skilled in the art, the consoles may house additional relays and other components to automate the instruments under computer control, e.g., automatic sample injection.

The present invention includes a suitable computer program written for an executed by the computer 16 so that said computer will control the instruments in the manner described. However, no particular inventive novelty is claimed for the program per se and rather the invention resides in the method of utilizing the above-described combination of elements or components, and these combinations of elements or components themselves, to achieve the advantageous result. That is, no invention is thought to reside in the software itself, apart from the software in combination with the remainder of the invention. The manner of operation includes:

1. determining the voltage ranges corresponding to the selected masses of certain components only of the unknown sample, which components may be the only ones in the unknown or the only ones in the unknown of interest;
2. supplying only said voltage ranges, via computer 16, the power supply 28, and switching circuits 32, to the particular mass spectrometer then under computer control; and
3. incrementally increasing and decreasing the power supplied to said spectrometer from power supply 28 and switching circuits 32 under the control of computer 16 to the voltage scanning means in said spectrometer, to thereby accurately define the ionization intensity peak within each of said ranges.

Figure 3:
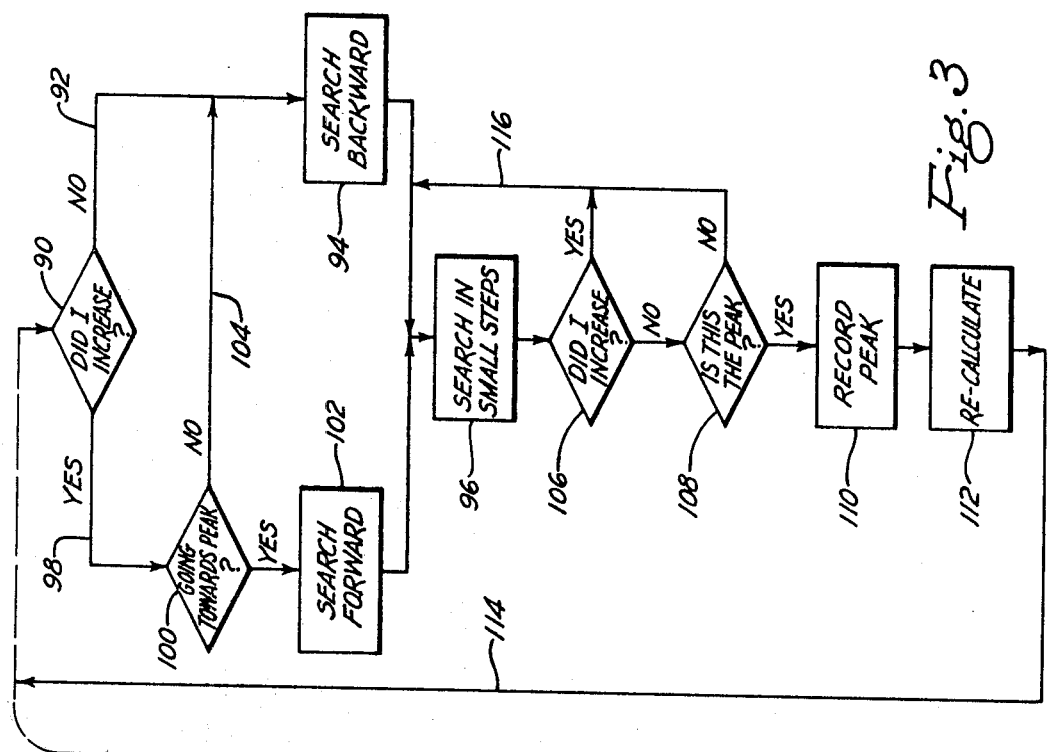
FIG. 3 is a generalized logic diagram of the programming of the computer.
Figure 3:
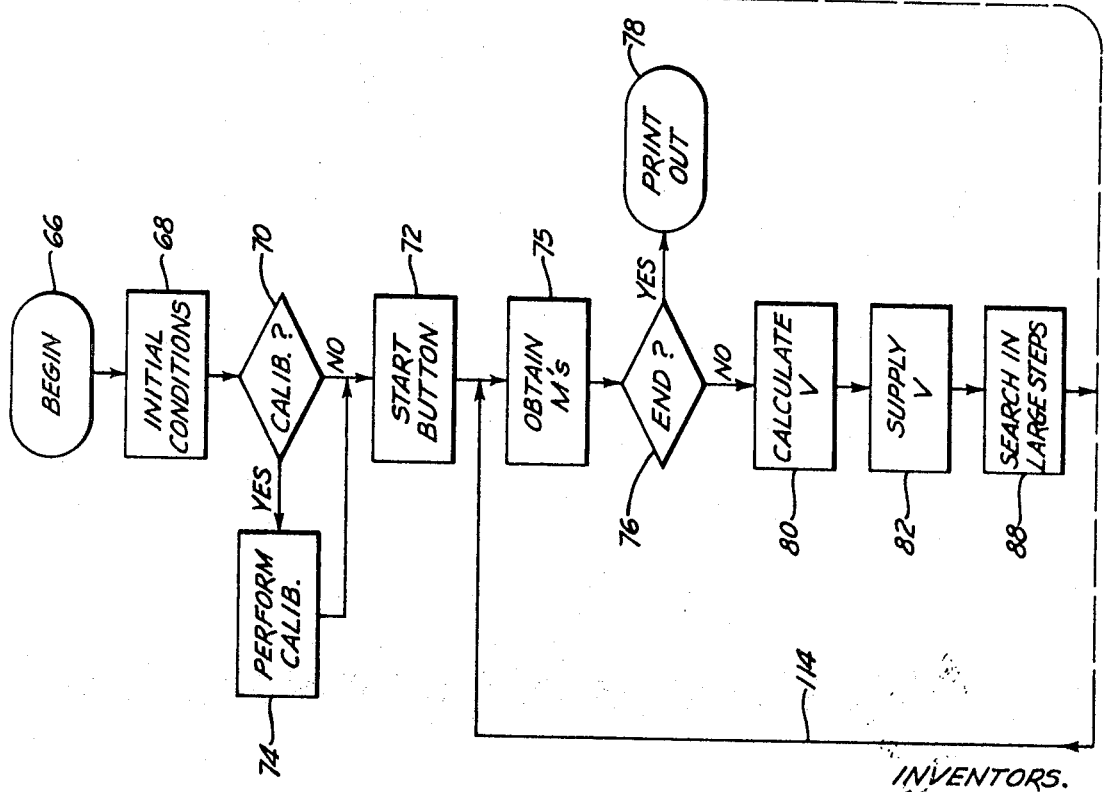

Referring now to FIG. 3, there is shown a logic diagram combining the programming used in computer 16, and certain steps performed by an operator in using the method and apparatus of the invention. The shapes of the boxes or blocks in FIG. 3 are significant. These shapes were borrowed from the computer art. A rectangular box indicates that the computer and/or the operator is to do something. The diamond shape indicates a decision point and is followed by two alternative routes, indicated by a "yes" or "no" response to the decision or question. The oblong shape indicates a terminal, that is, the beginning or the end.

Block 66 indicates the start of a test run. Block 68, labeled "initial conditions" is the point at which the operator specifies the test in general terms. For example, the operator specifies the mass numbers in question or of interest, the formats in which he will present the input data and in which he wishes the output date to be presented, and the value of $K$ in equation (2) above to be used later by the computer, if it is known. If $K$ is not known, then the accelerating voltage at which the calibration scan is to begin is supplied. If repetitive samples are to be analyzed, then a list of mass numbers could be stored in the computer's memory, and access had to that list by a method number, key word, special code, or the like, in lieu of specifically supplying mass numbers for each analysis. The computer 16, in response to this information, provides suitable signals on line 26 to the power supply, line 36 to the A/D converter, and line 20 to the output device 18. Via circuits 32 and line 50, the computer 16 can establish a path through circuits 32 to a particular instrument.

The next logic module 70 may be thought of as asking the question of whether or not a calibration of the instrument to be used is required. At this point it might be pointed out that the program also includes means to permit the operator to communicate with the computer in the so-called "conversational mode." This means that the computer will "ask" the operator various questions programmed into it by typing out the question, and will wait for the operator to type in or otherwise supply the answer at TTY 18.

In the event no calibration request is received, which, for example, would be the case if a series of similar unknowns were being tested, the logic proceeds directly to the next module 72 and the value of $K$ supplied in module 68 is used.

On the other hand, if the answer to the question asked by module 70 is yes, a calibration is required, such as would be the case when first starting up the day's work, or changing to a different type of unknown, then the flow of the logic makes a "sideways excursion" to module 74. Logic block 74 may be thought of as "sideways" in that it is off of the main vertical line of the line of logic. In making a calibration, the operator injects some standard sample into the instrument. A standard sample is one containing only one element, the mass number of which is known. The computer then calculates the above equation (2) for the value of $K$, the value of $M$ being known, and a value for $V$ being determined by a preliminary analysis. After the calibration is complete, the logic proceeds to module 72.

In module 72 the equipment is ready to start a test, and the operator presses the start button to permit the logic to proceed to the next module 75. In module 75, computer 16 obtains, from its own memory, the mass numbers or the mass numbers of the elements given it in block 68 above as being the masses or elements of interest.

In decision block 76 the question is asked whether or not there are any mass numbers remaining. If the answer is no, the end of test has been reached and the logic makes a sideways excursion to end terminal block 78. All the stored results are printed out in accordance with the format supplied earlier. If the answer is yes, as for example at all interim points in running a test, the logic proceeds down the main line to block 80 in which the computer calculates the value of $V$ to be supplied to the instrument via the power supply, using the value of $M$ taken from memory and the value of $K$ either supplied in block 68 or calculated in block 74. Having completed the calculation, some value is established for $V$, and the logic proceeds to block 82 in which this value of $V$ is supplied by the computer via line 26 to the power supply 28, and then on to the instrument being serviced via the switching circuits 32.

Figure 4:
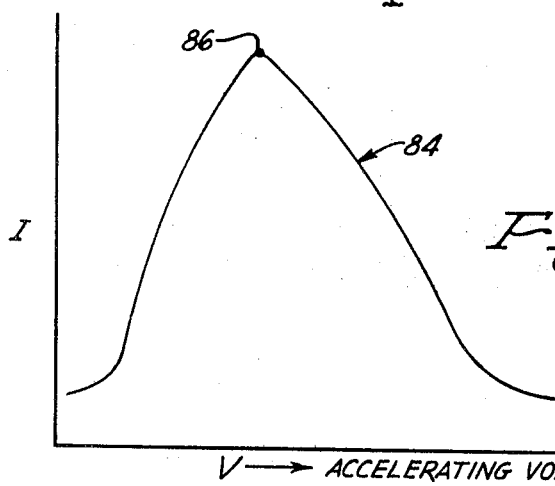
FIG. 4 is a curve useful in explaining the logic diagram of FIG. 3.

Referring to FIG. 4, the curve 84 represents the relationship of $V$, the voltage supplied to the acceleration plates or the like of the instrument, to the intensity of the ion beam as detected at the "target means" or output end generally of the instrument. Curve 84 is characteristic of the particular ion in question. The object, of course, is to find that value of $V$ corresponding to point 86 which is the peak of the curve to thereby determine the height of the curve at the peak which is the ion intensity of interest. It will be understood by those skilled in the art that curve 84 is an idealized showing. Frequently, mass spectrometers produce curves having minor dips in them, a series of smaller peaks leading up to one peak, no single well defined peak, or other different cases. Virtually all of these more difficult situations can be accommodated with the method and apparatus of the invention, as will appear below.

Ideally, the value of $V$ calculated in block 82 will correspond exactly with point 86. As a practical matter however, because of small drifts in the mass spectrometer's electronics and/or magnetic field, they usually do not so correspond exactly. Therefore, the logic proceeds to block 88 in which the value of $V$ is stepped forward, to the right in FIG. 4, in relatively large increments. The purpose of block 88 is to detect a general trend upward or downward. Two or three relatively large steps or increments are taken at this point to effectually "filter out" any small variations and the like which might be on the curve. These large increments verify the upward or downward trend.

The next logical step, block 90, is a decision point and asks the question whether or not intensity $I$ increased in response to each relatively large step forward in $V$. Again referring to FIG. 4, the initial value of $V$ could have been either to the left of peak 86 or else on or to the right of peak 86. In the event the initial value of $V$ was on or to the right of peak 86 then the answer to the question of block 90 would be no and the logic would proceed down the right hand parallel path 92 to a logic block 94. In block 94 the computer is instructed to search backwards upon entering the next logic block 96, wherein it will search as directed in very small increments. If the answer to the question of block 90 was yes, then the initial value of $V$ was probably to the left of peak 86, and the logic proceeds down the left hand parallel line 98 to a decision block 100. It is in block 100 that the assumption is checked, that is, that the initial value of $V$ was to the left of the peak 86. In the event the verification is positive, that is the initial value of $V$ was to the left of peak 86, the logic proceeds to the next block 102 which is similar to block 94 explained above, except that it instructs the computer to search forward in small steps in logic block 96. In the event the verification is negative as determined in block 100, then the logic proceeds on a transverse line 104 into line 92 and down the right-hand parallel logic line via block 94 to block 96. This would most likely occur in the event that some aberration of the curve 84 were encountered. Block 96, in response to instructions from either one of blocks 94 or 102 then drives the power supply to step $V$ forward or backward, as instructed, in very small steps. Decision block 106 asks the question did $I$ increase. If the answer is no, then the last value was possibly the peak maximum and the logic proceeds to verification decision block 108 which asks the question is this the peak maximum. If the answer is yes, the logic proceeds to the block 110 which records the maximum peak value in the computer's memory, and then on a block 112 which uses the value of $V$ corresponding to the peak ion intensity found in block 108 to recalculate $K$ according to equation (2) above using the mass number of this peak. Thus, the value of $K$ will be updated for the next peak. The logic then proceeds along the loop line 114 back to the junction between blocks 72 and 75 to test the unknown for the next value of $M$ initially supplied in block 68, or to print out the results stored in the repetitive steps of block 110 if the test is complete.

Returning to decision blocks 106 and 108, if the answer to the question of block 106 is yes or the answer to block 108 is no, both indicating the peak has not been found, the logic returns on a loop line 116 to the input side of block 96 to continue the small step search for the peak maximum. Block 108 performs its verification function by stepping accelerating voltage an additional arbitrary number of times in the same direction. The occurrence of succeeding decreasing values in ion intensity confirms that the value found in block 106 is indeed the peak maximum. The number of additional steps is determined by the nature of the particular instrument being serviced. If ion intensity does not decrease in response to the steps of block 108, then some aberration on the curve and not the main peak has probably been encountered, and the search for the peak maximum continues via line 116 returning the logic to block 96.

While the invention has been described in detail above, it is to be understood that this detailed description is by way of example only, and the protection granted is to be limited only within the spirit of the invention and the scope of the following claims.

We claim:

1. A method of supplying power to at least two points of use in certain predetermined ranges of power and then varying the power supplied within each range in relatively small increments, comprising the steps of selecting one of said points of use for operation, determining the ranges within which power is to be supplied to said point of use, supplying power from power supply means under the control of control means within said ranges only to said selected point of use, and increasing and decreasing the power supplied to said point of use from said power supply means under the control of said control means in relatively small increments within each of said ranges.

2. The combination of claim 1, and feeding back signals from said selected point of use to said control means indicative of a value of the power supplied at said point of use, whereby said control means corrects its control of said power supply means in accordance with the data fed back from said point of use.

3. The combination of claim 1, wherein said points of use comprise a plurality of mass spectrometers, and said power supply means supplies power to the deflection means within said mass spectrometers, and wherein said ranges comprise voltage ranges corresponding to the masses of certain selected ions in an unknown being analyzed, and wherein said voltage is varied in relatively small increments to accurately define an ionization peak within each of said ranges.

4. Apparatus for supplying power to at least two points of use in certain predetermined ranges of power and then varying the power supplied within each range in relatively small increments, comprising power supply means to produce the power in said increments within said ranges, control means connected to said power supply means to drive said power supply means, switching means controlled by said control means to feed power from said power supply means to any selected one of said points of use, means to feed signals back from each of said points of use to said control means via said switching means indicative of a value of the power supplied at said point of use, whereby said control means corrects its control of said power supply means in accordance with the data fed back from said point of use.

5. The combination of claim 4, said at least two points of use comprising at least two mass spectrometers.

6. The combination of claim 5, and a number of operator consoles equal to the number of said mass spectrometers with one console associated with each spectrometer, means interconnecting each of said consoles with both its associated spectrometer and said control means.

7. The combination of claim 4, said control means comprising a general purpose stored program digital computer.

8. The combination of claim 7, said feed back means comprising an analog-to-digital converter.

9. The combination of claim 4, said switching means comprising a number of relays equal to the number of said points of use, each of said relays including a coil selectively operable by a control signal from said control means, each of said relays including a first set of contacts operable by said coil to close the circuit between said power supply means and said point of use, and each of said relays including a second set of contacts operable by said coil to close a circuit between said point of use and said feedback means.

* * * * *